United States Patent
Crowley et al.

(10) Patent No.: US 6,481,005 B1
(45) Date of Patent: Nov. 12, 2002

(54) EVENT CORRELATION FEATURE FOR A TELEPHONE NETWORK OPERATIONS SUPPORT SYSTEM

(75) Inventors: Joseph L. Crowley, Red Bank, NJ (US); Yossi A. Nygate, Columbus, OH (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 08/170,111

(22) Filed: Dec. 20, 1993

(51) Int. Cl.[7] .................................................. G06F 9/44
(52) U.S. Cl. ...................................................... 717/100
(58) Field of Search ................................. 395/650, 700, 395/200.11, 838, 183.15, 184.01, 160, 1; 340/500, 501, 506, 825.06, 825.07, 825.17, 825.02; 379/111, 114, 115, 121, 122, 1, 10, 15, 16, 96; 364/185, 140, 514, 221.7; 370/13, 17

(56) References Cited

U.S. PATENT DOCUMENTS

| | | | | |
|---|---|---|---|---|
| 4,812,819 A | * | 3/1989 | Corsberg | 340/517 |
| 5,159,685 A | * | 10/1992 | Kung | 395/575 |
| 5,175,800 A | * | 12/1992 | Galis et al. | 395/51 |
| 5,226,120 A | * | 7/1993 | Brown et al. | 395/200 |
| 5,285,494 A | * | 2/1994 | Sprecher et al. | 379/59 |
| 5,295,230 A | * | 3/1994 | Kung | 395/75 |
| 5,295,244 A | * | 3/1994 | Dev et al. | 395/161 |
| 5,327,349 A | * | 7/1994 | Hoste | 364/468 |
| 5,333,183 A | * | 7/1994 | Herbert | 379/112 |
| 5,337,320 A | * | 8/1994 | Kung | 371/15.1 |
| 5,369,756 A | * | 11/1994 | Imura et al. | 395/575 |
| 5,388,189 A | * | 2/1995 | Kung | 395/50 |

OTHER PUBLICATIONS

Shimazaki et al, "Neopilot: An Integrated ISDN Fault Management System", Globecom '90: IEEE Global Telecommunications Conference, Apr. 1990, pp 1503–1507.*

Kraimer et al, "Alarm Handler for the Advanced Photon Source Control System", Particle Accelerator, 1991 Conference, May 1991, pp 1314–1316.*

Pfau–Wagenbauer, "Integrating Model–Based and Heuristic Features in a Real–Time Expert System", IEEE Expert Magazine, Aug. 1993, pp. 12–18.*

"Using artificial intelligence and a graphical network database to improve service quality in Telecom Australia's customer access network" by J. R. McIntyrce, SUPERCOMM/ICC '92, IEEE.*

"AIX Net View/6000" by J. H. Chou et al, IBM Systems Journal, Jun. 1992 v31 n2 p270 (16).*

"Managing Computer Communications" by D. B. Davis, High Technology, vol. 7, No. 3 p 24–26,29,30, Mar. 1987.*

* cited by examiner

Primary Examiner—Gregory Morse
Assistant Examiner—Todd D. Ingberg
(74) Attorney, Agent, or Firm—Frederick B. Luludis; Matthew J. Hodulik (57) ABSTRACT

The management of a telephone network is enhanced by arranging an associated operations system so that it correlates related messages, e.g., alarm messages, that may be received from different elements forming the network. Advantageously, then, related messages may be displayed together on the display of a terminal, rather than intermingling those messages on the display with other unrelated messages in some predetermined order, such as the order in which the messages are received. In this way a user may view and readily determine the underlying cause which prompted the generation of displayed correlated messages.

5 Claims, 8 Drawing Sheets

| DATE | TIME | SYSTEM | A OFFICE | Z OFFICE | TROUBLE INDICATION |
|---|---|---|---|---|---|
| 09jun | 5:30 | nti_s_n | CLLI_Y | CLLI_A | LINK FAIL LS1 1 |
| 09jun | 5:29 | att_s_n | CLLI_W | | ROUTE RESTRICTED |
| 09jun | 5:28 | 5e_s_n | CLLI_A | CLLI_Y | SWITCH ISO 255100001 |
| 09jun | 5:27 | att_s_n | CLLI_E | | ROUTE PROHIB 255 |
| 09jun | 5:26 | 5e_s_n | CLLI_A | CLLI_Y | PATH LOSS 001 |
| 09jun | 5:24 | 5e_s_n | CLLI_A | CLLI_Y | LINK FAIL 32-01 |
| 09jun | 5:23 | nti_s_n | CLLI_W | CLLI_E | ROUTE FAIL 001 |
| 09jun | 5:22 | FIBER203T4 | CLLI_E | CLLI_R | HARDWARE FAIL |
| 09jun | 5:06 | att_s_n | CLLI_Z | CLLI_A | PATH LOSS 255 |
| 09jun | 5:04 | att_s_n | CLLI_Z | CLLI_A | LINK FAIL 15-01 |
| 09jun | 5:03 | nti_s_n | CLLI_E | | ROUTE RESTRICTED |
| 09jun | 5:02 | att_s_n | CLLI_Z | CLLI_A | LINK FAIL 15-02 |
| 09jun | 5:01 | nti_s_n | CLLI_E | CLLI_W | ROUTE FAIL 005-1 |
| 09jun | 5:00 | 5e_s_n | CLLI_A | CLLI_Z | PATH LOSS 005 |
| 09jun | 4:58 | 5e_s_n | CLLI_A | CLLI_Z | LINK FAIL 04-01 |

| PRECEDENCE SELECTED | DATE | TIME | L | Z | SYSTEM | A OFFICE | Z OFFICE | TROUBLE INDICATION |
|---|---|---|---|---|---|---|---|---|
| | | ********** | | | CORRELATION WINDOW | ********** | | |
| 1 | 09jun | 5:24 | | | 5e_s_n | CLLLA | CLLLY | LINK FAIL 32-01 |
| | | ********** | | | CORRELATION GROUP 1 | ********** | | |
| | 09jun | 5:28 | 2 | | 5e_s_n | CLLLA | CLLLY | SWITCH ISO 255100001 |
| 2 | 09jun | 5:26 | 2 | | 5e_s_n | CLLLA | CLLLY | PATH LOSS 001 |
| 3 | 09jun | 5:30 | 2 | | nti_s_n | CLLLY | CLLLA | LINK FAIL LS1 1 |
| + | 09jun | 5:24 | 2 | | 5e_s_n | CLLLA | CLLLY | LINK FAIL 32-01 |
| 4 | 09jun | 5:22 | 1 | | FIBER203T4 | CLLLE | CLLLR | HARDWARE FAIL |
| 3 | 09jun | 4:29 | 2 | | nti_s_n | CLLLY | CLLLA | LINK FAIL LS1 2 |
| + | 09jun | 4:27 | 2 | | 5e_s_n | CLLLA | CLLLY | LINK FAIL 32-02 |
| 4 | 09jun | 4:24 | 1 | | T-CAR101T1 | CLLLD | CLLLQ | HARDWARE FAIL |
| 2 | 09jun | 5:06 | 2 | | att_s_n | CLLLZ | CLLLA | PATH LOSS 255 |
| + | 09jun | 5:00 | 2 | | 5e_s_n | CLLLA | CLLLZ | PATH LOSS 005 |
| 3 | 09jun | 5:04 | 2 | | att_s_n | CLLLZ | CLLLA | LINK FAIL 15-01 |
| + | 09jun | 4:58 | 2 | | 5e_s_n | CLLLA | CLLLZ | LINK FAIL 04-01 |
| 4 | 09jun | 4:56 | 2 | | 5e_s_n | CLLLA | CLLLZ | CNGSTN RESTART 15-01 |
| + | 09jun | 4:55 | 2 | | att_s_n | CLLLZ | CLLLA | OVERLOAD FAIL 04-01 |
| 5 | 09jun | 4:50 | 2 | | att_s_n | CLLLZ | CLLLA | HI TRAFFIC DMND |
| 3 | 09jun | 5:02 | 2 | | att_s_n | CLLLZ | CLLLA | LINK FAIL 15-02 |
| + | 09jun | 4:56 | 2 | | 5e_s_n | CLLLA | CLLLZ | LINK FAIL 04-02 |
| 4 | 09jun | 4:54 | 2 | | att_s_n | CLLLZ | CLLLA | OVERLOAD FAIL 04-02 |
| + | 09jun | 4:52 | 2 | | att_s_n | CLLLZ | CLLLA | CNGSTN RESTART 15-02 |
| 5 | 09jun | 4:50 | 2 | | att_s_n | CLLLA | CLLLZ | HI TRAFFIC DMND |

EVENT CORRELATION FEATURE FOR A TELEPHONE NETWORK OPERATIONS SUPPORT SYSTEM

FIELD OF THE INVENTION

The invention relates to telephone networks and more particularly relates to an operations support system associated with a telephone network.

BACKGROUND OF THE INVENTION

The performance of a telephone network is typically tracked by an associated Network Management System (NMS). In doing so, the NMS accumulates, and processes various reports outputted by individual facilities, e.g., switches, signaling equipments, forming the network. The reports typically include alarm messages characterizing respective network faults. The NMS stores the messages memory and thereafter displays them on the display of a user's terminal. At that point the user may analyze the alarm reports and possibly schedule the repair of the underlying causes of the alarms. When the faults have been attended to (i.e., cleared) then a clear message is generated and the NMS removes the associated alarm message from memory.

On occasion, different telephone network elements may generate multiple alarms as a result of a single fault occurring in one of the elements. For example, a problem in a signaling network may cause a telephone switch, carrier facility and signal transfer point to each generate one or more alarms, which are forwarded to the associated NMS for processing. The NMS then displays those alarms along with a large number of other alarms generated by other network elements on the display of a user's terminal. To help the user to identify particular network problems, the NMS may sort the alarms using a particular sorting criteria, e.g., time, severity, etc. Regardless of which sorting criteria is used, the user is still faced with viewing many displayed pages of intermingled alarms caused by different network faults. It is, therefore, difficult for the user to identify a problem which may have caused a number of different alarms to be generated.

SUMMARY OF THE INVENTION

The foregoing problem is addressed and an advancement in the art is achieved by arranging an operations support system so that it correlates related messages that are generated by different sources of messages, in which the correlation of the messages is performed in accord with a predetermined set of correlation rules priorly entered by a user. The correlation process, in accord with an aspect of the invention, (a) identifies all groups of priorly received messages associated with the newly received message, (b<; the newly-received message to each identified group and (c) combines all of the identified groups that may be combined in accordance with the entered rules.

A particular group(s) of correlated messages may then be displayed on the display of an associated terminal responsive to a request entered by the user via the terminal.

This and other aspects of the invention will be appreciated upon reviewing the following detailed discussion and ensuing claims.

BRIEF DESCRIPTION OF THE DRAWING

In the Drawing.

PIG. 5 shows correlated alarm messages in tree format and shows an example of the code that generates that tree.

DETAILED DESCRIPTION

Figure 1:
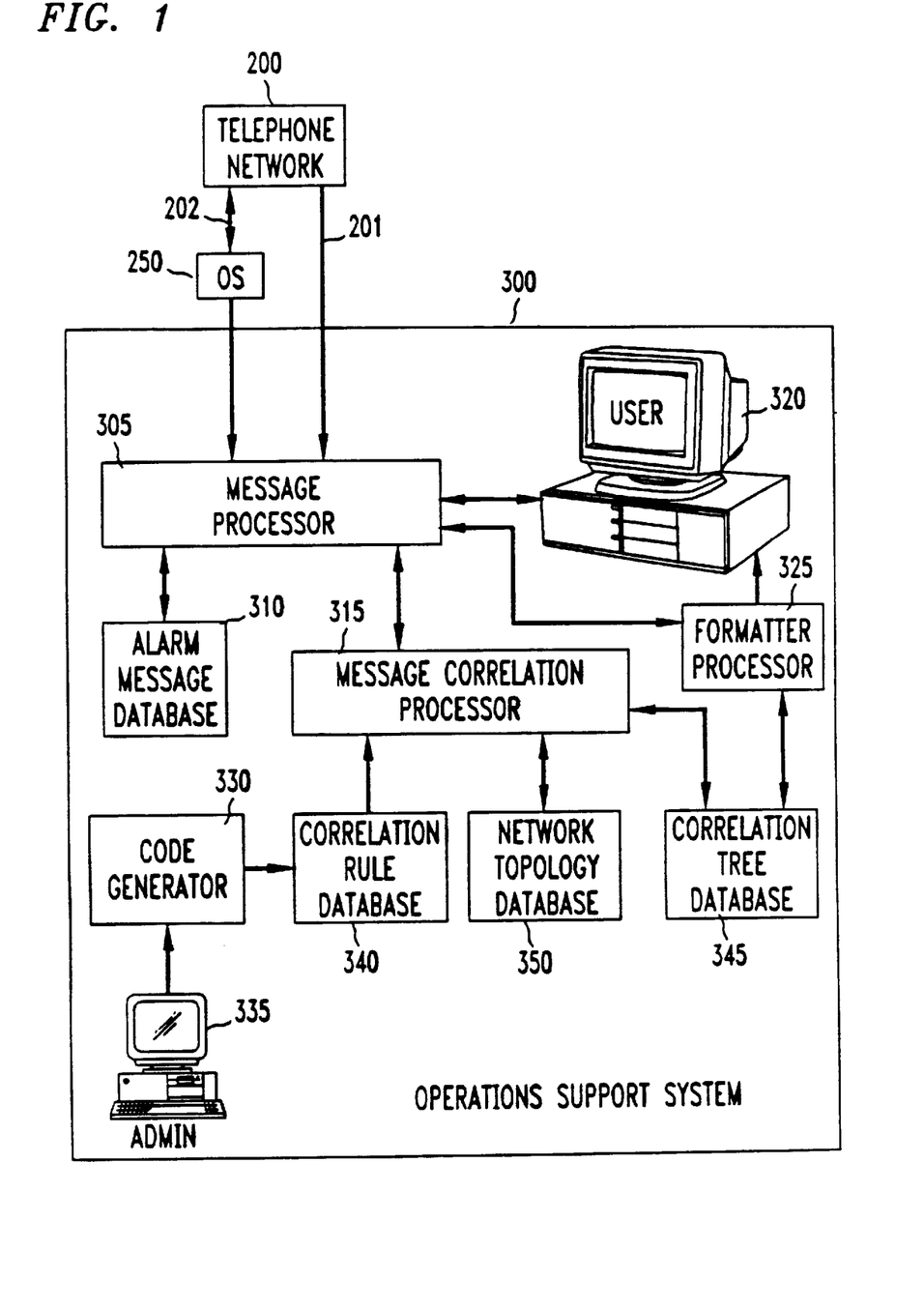
FIG. 1 shows in block diagram form an operations support system in which the principles of the invention may be practiced.

Turning now to FIG. 1, there is shown a broad block diagram of a conventional telecommunications network 200 and Operations Support (OS) system 300. OS system 300, more particularly, supports the operation of network 200. One aspect of such, support deals with tracking the performance of network 200 by accumulating and processing alarm messages generated by individual network elements comprising network 200. An alarm message may be generated by a network element, such as a switch within network 200, as a result of one of a number of different conditions, for example, a hard or intermittent fault. When a fault occurs and it is detected by network 200, then an alarm message indicative of the fault is sent to system 300 via path 201. A fault condition associated with a network element may be detected by Operations System (OS) 250 as a result of OS 250 "diagnosing" the network element via path 202. If, as a result of such "diagnostics", OS 250 uncovers a problem, then OS 250 generates a message indicative of the problem (fault) and supplies the message to OS 300 for further processing. In the same way, when a fault condition returns to normal, an "alarm clear" message is generated and sent to OS 300. Each alarm clear message corresponds to a preceding alarm message that originally reported the fault condition.

Message processor 305 receives such messages from network 200 and OS 250, and, in turn, reformats each such message and then passes the message through a filtering process. The filtering process filters each alarm message using a value thresholding scheme, e.g., time or rate based thresholding, depending on the type of alarm message that processor 305 receives. If the receipt of an alarm message causes the associated threshold to be met or exceeded, then processor 305 (a) associate's the message with a unique identifier, (b) stores the message and unique identifier in associated database 310 and (c) supplies the message and its unique identifier to correlation processor 315. For each alarm clear message, processor 305 (a) associates the alarm clear message with the identifier of the corresponding alarm message that originally reported the fault, (b) updates the corresponding alarm message and unique identifier in associated database 310 and (c) supplies the updated message and its unique identifier to correlation processor 315.

Correlation processor 315 responsive to receipt of a message either creates or updates one or more so-called correlation "trees" that are stored in database 345. Processor 315 does this based on a relationship between the received message and other messages previously received from processor 305, as will be explained below in detail. It suffices to say at this point, however, that the relationship among messages is determined according to particular rules that are entered by an administrator via terminal 335. Such rules are then translated by code generator 330 and stored in rule database 340.

A user operating terminal 320 may enter a request to have alarm messages that are stored in database 310 displayed on the display of terminal 320. The request may include a viewing option specifying that the messages are to be displayed in a number of different ways, such as, for example, either in reverse chronological order or in highest-to-lowest severity order. Processor 305, responsive to the request, retrieves the messages from database 310, sorts them based on the entered request, and then displays the sorted alarm messages a page at a time on terminal 320. Briefly, referring to FIG. 2, there is shown an illustrative example of one way (e.g., reverse chronological order) in which processor 305 displays a page of reformatted alarm messages on terminal 320.

Figure 2:
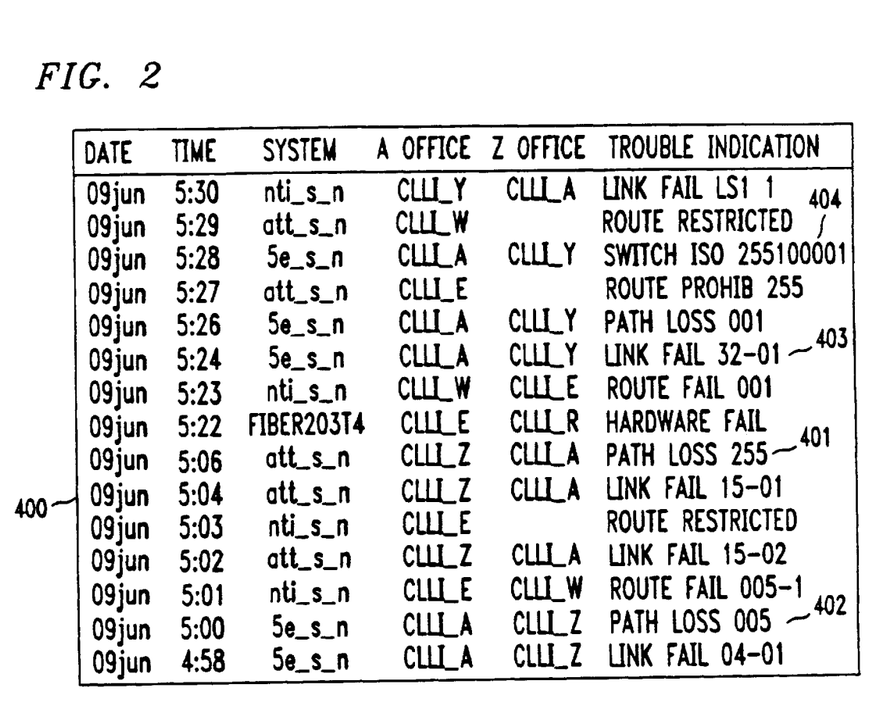
FIG. 2 illustrates an example of one way in which alarm messages generated by network 200 may be displayed on the display of a user terminal.

It is seen from FIG. 2 that the display of alarm messages does not show any relationship between associated alarm messages. That is, a number of displayed (and undisplayed) alarm messages may be related to one another as a result of being caused by the same problem. For example, consider a network failure, such as the failure of a signaling path between network 200 switches. In that case, it is likely that each of those switches will generate alarms. However, their relationship to one another is not readily determined from the screen of messages that are displayed on terminal 320, i.e., FIG. 2. In fact, displayed messages 401 and 402 of screen 400 as well as other messages that are not displayed but stored in database 310 are related to one another.

Heretofore, the relationship between displayed alarm messages was determined manually by the user viewing the screen of alarm messages. It can be appreciated that the user would need to have an appreciable knowledge of the elements comprising network 200 in order to do so. It can also be appreciated that irrespective of such knowledge, it is likely that the user may not be able to recognize all such relationships. We have recognized that that problem may be readily dealt with, in accord with an aspect of the invention, by correlating alarm messages with one another as they are received at system 300 and storing such correlations in a database so that a particular correlation between alarms may be quickly displayed on terminal 320 when requested by the user. Accordingly, if the user points a screen cursor (not shown) at a particular displayed message, then that message and all of its related messages (if any) are displayed on terminal 320 in page form. Typically, each page can contain up to 16 messages, thus if the number of related alarm messages is greater than sixteen, then two or more screens will be formed. In addition, the alarm messages forming a screen are displayed in what we call "correlated order",— meaning that the messages are displayed in a tree-like order, in which the order is based on particular correlation rules entered by the administrator of system 300 via terminal 335. For example, the alarm message, indicative of the ultimate effect of a problem may be displayed at the root of the tree and alarm messages indicative of the causes of the problem may be displayed as the leaves of the tree.

With the forgoing in mind, assume at this point that the user points the terminal 320 screen cursor (not shown) at message 403 as a way of entering a request for a correlation screen involving that message. Terminal 320, responsive thereto, sends the request to the message processor, which then forwards the message and its associated identifier to formatter processor 325. Processor 325, in response thereto, retrieves from database 345, all trees of correlated messages associated with the received identifier. Formatter processor 325 assembles the messages with respect to one another based on their correlated order within the tree(s) and then supplies the result to terminal 320 for display.

Figure 3:
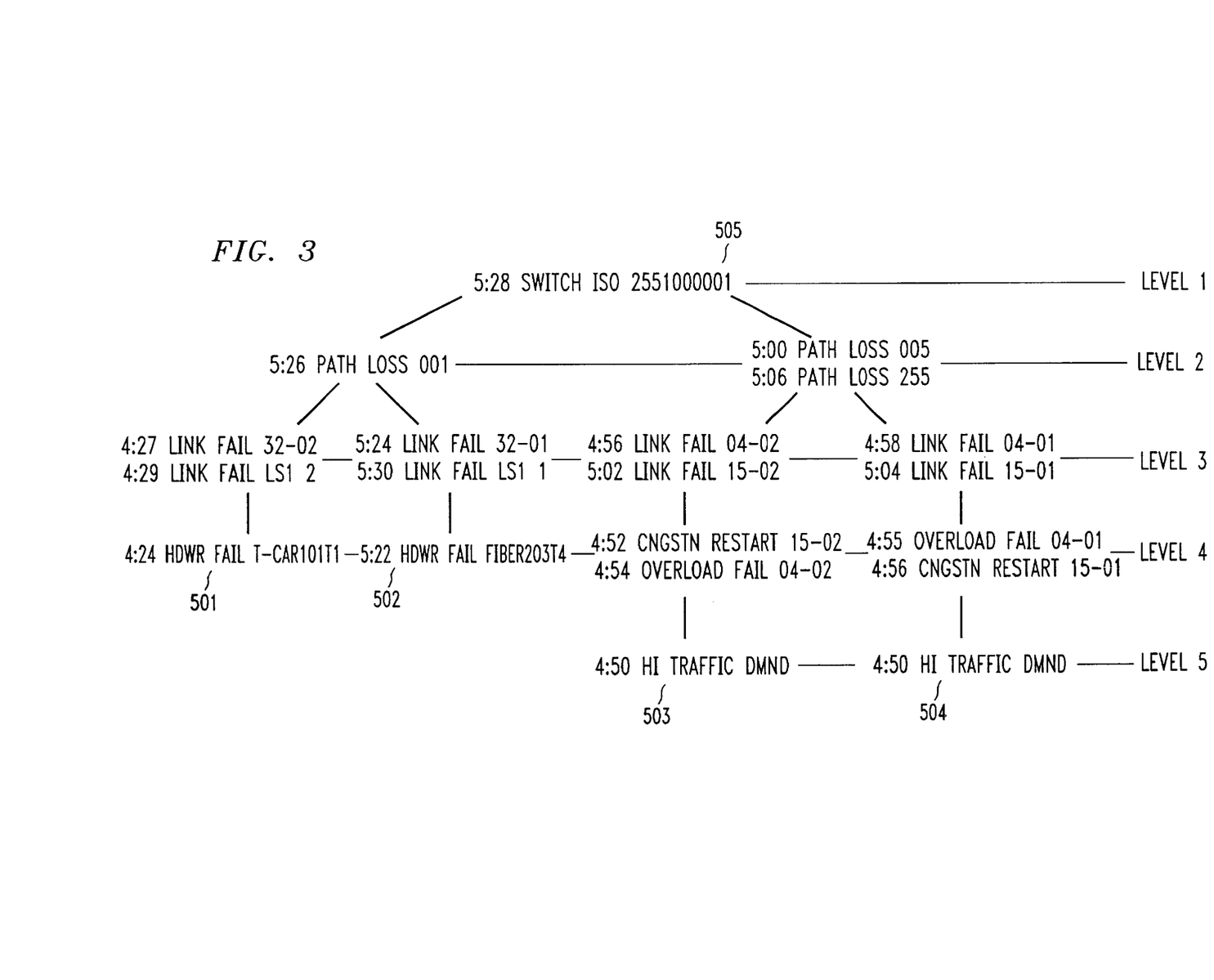
FIG. 3 illustrates the way in which ones of the alarm messages of FIG. 2 may be correlated.

An example of a tree built by correlation processor 315 is shown in FIG. 3, in which message 404 (FIG. 2) is at the first level (root) of a five level tree. The fourth level includes messages 501 and 502, and the fifth level includes messages 503 and 504, which are the leaves (last messages) in the tree, and therefore, it is likely that they are the cause of the problem whose effect is demonstrated by message 505. (The tree of FIG. 3 shows the time and trouble indication of each message. As seen from FIG. 2, messages contain other information, such as date, system, A Office and Z Office. These are not shown in FIG. 3 for reasons of clarity and conciseness of the detailed description.)

It is seen by comparing FIG. 2 with FIG. 3 that messages occurring prior to the time of 4:58, such as alarm messages 501, 503 and 504 are not displayed in the screen of FIG. 2, but would be displayed in a succeeding screen. Accordingly, it would be difficult for a user to correlate alarm messages that are displayed in different screens 400. It is evident from FIG. 3 that the level-one message branches out to level-two messages, level-two messages branch out to level-three messages, and so on. (The way in which correlation processor 315 forms a tree, e.g., the tree of FIG. 3, from related alarms will be discussed below in detail.)

Figure 4:
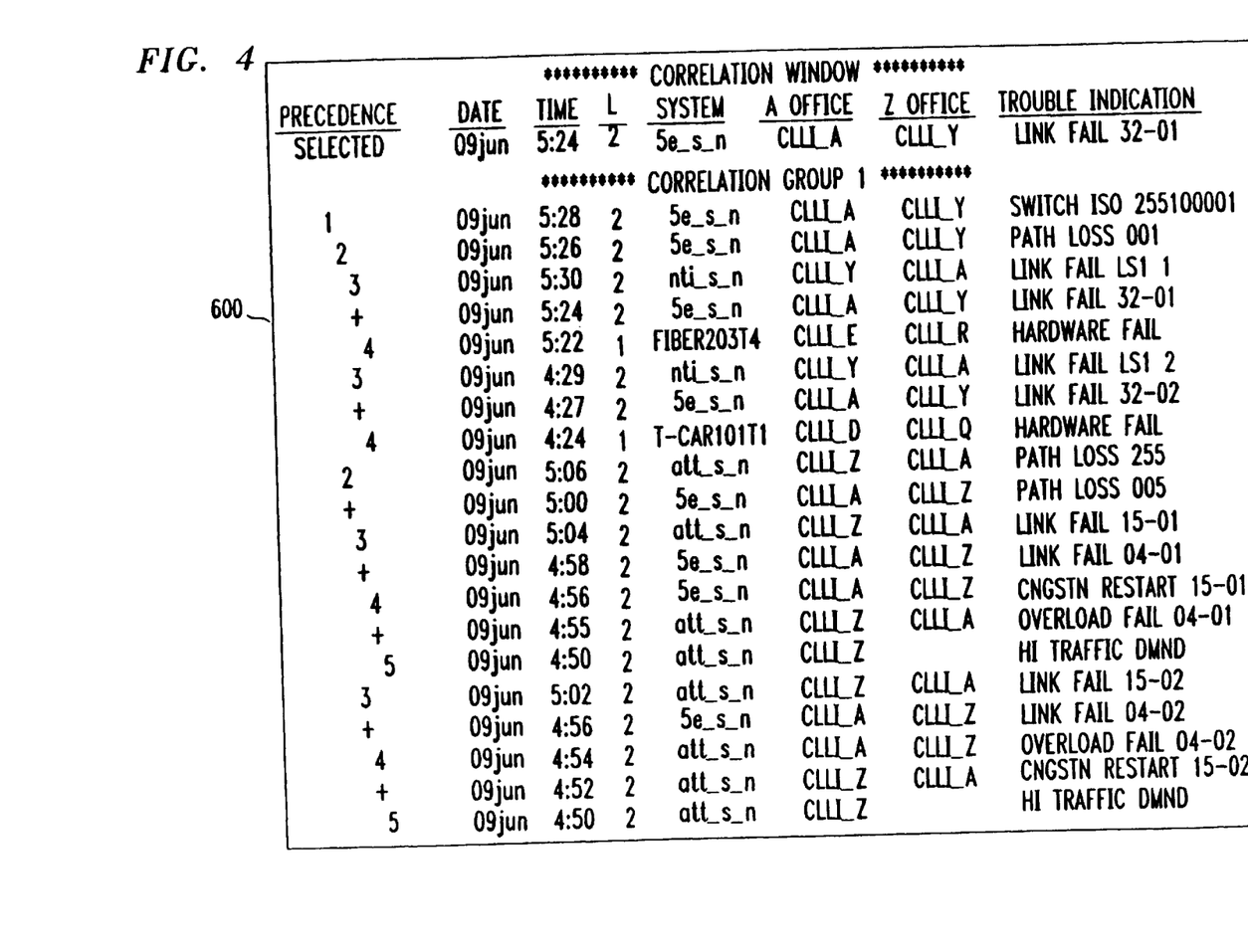
FIG. 4 shows the way in which the result of such correlation may be displayed on the user's terminal.

As mentioned above, database 345 at the direction of processor 315 retrieves the messages forming the tree of FIG. 3 and passes the messages to formatter processor 325. Processor 325, in turn, assembles the messages based on their position in tree 500 and supplies the result to terminal 320 for display. An illustrative example of the latter display is shown in FIG. 4. (It is noted that the meaning of the various alarm messages shown in FIGS. 2, 3 and 4 is not pertinent to the claimed in invention and will not be dealt with herein. What is pertinent is the relation between messages and their positions within a tree, which is built in accord with the rules supplied by the system 300 administrator, as will be discussed below.)

Turning to FIG. 4, it can be appreciated that the displayed screen of alarm messages substantially corresponds with the tree of FIG. 3. Thus, in response to a simple user request, the user is automatically presented with a screen showing all alarm messages that relate to one another, thereby relieving the user from having to manually perform such correlation.

As mentioned above, processor 315 correlates alarm messages based on rules entered by, an administrator via terminal 335. To begin with, the administrator may develop a schematic of a "skeleton" of a particular correlation tree, such as a correlation tree for a signaling link failure, as shown in the left-hand side of FIG. 5. In the skeleton tree of FIG. 5, the child/parent link is equivalent to a cause and effect relationship. Equivalent messages (such as cngstn-restart or overload-fail) are on the same node (level) and multiple children that belong to a parent are "or" branches. That is, a link failure (fail) can cause a path loss, whereas a hardware (HDWR) fail, cngstn restart or overload-fail may cause a link fail. However, it can be appreciated that may not always be the case.

A system administrator defines a schematic of a correlation tree, in accordance with a number of definitions (to be discussed below), using a pseudo-English language to define the message(s) at each level of a tree as well the conditions under which the messages in a tree correlate with one another. For the tree of FIG. 5, the portion of the language defining the messages at each level of the tree is shown on the right-hand side of FIG. 5.

A first one of the aforementioned definitions specifies that two alarm messages are related to one another and thus correlate if they satisfy the correlation rules specified in the correlation group, in which a correlation group is defined herein as being a set of rules that define a correlation tree skeleton and, in addition, specify the conditions under which the messages in a tree correlate with one another, as discussed below.

The conditions under which the messages in a tree correlate is typically specified by comparing the contents of one or more fields of a newly-received message to the contents of one or more fields of a message that has been determined to belong to a tree (also known as an old message). For example, for messages that have a field called "Z Office", as may be encountered in a switch isolation (switch iso) messages, a correlation condition could specify that a newly-received switch iso message correlates with an earlier switch iso message if they have the same information in the "Z Office" field. That is, if the Z Office of the new message is equal to the Z Office of the old message.

A correlation rule assigns a level (or precedence) to a new message, and then specifies that said new message correlates an old message under certain conditions (e.g. cases). Each case specifies a type of old message that may correlate to the new message as well as the fields of the new message and the fields of the old message that must have matching contents for the two messages to actually correlate. (As an aside, fields whose contents must match can be shown with an "equal sign" between them. i.e., new_message_Z_Office=old_message_Z_Office).

A second definition specifies that a correlation tree is comprised of nodes such that (a) each node is composed of a primary message and one or more equivalent messages, (b) a parent node may or may not have children nodes and (c) each primary message must relate to (i) the primary message of its parent node (if it exists), (ii) all primary messages in the associated nodes and (iii) at least one of its equivalent messages. A third definition specifies that (a) a branch of a correlation tree is a set Of nodes that start at the root of the tree and end at a leaf and (b) each such branch us equivalent to a branch in the correlation tree skeleton. A fourth definition specifies that for each branch of the tree and message a correlation triplet comprises (a) a "parent", which is a primary message having the lowest precedence that is higher than the precedence of the current, or new, message; (b) "siblings", which are primary messages and equivalent messages having the same precedence as the current message and (c) a "child", which is a primary message whose precedence is the highest of all messages having a precedence lower that the current message.

For example, consider a tree with a branch containing messages associated with precedence levels of 1, 2, 3 and 5, as represented in Table 1 below. In that case then, a triplet may be associated with different precedences based on the precedence of a newly received alarm message, as set forth in Table 1.

TABLE 1

| New Message | Precedence | Parent | Sibling Child |
|---|---|---|---|
| 1 | — | 1 | 2 |
| 2 | 1 | 2 | 3 |
| 3 | 2 | 3 | 5 |
| 4 | 3 | — | 5 |
| 5 | — | 5 | — |
| ≧6 | 5 | — | — |

A fifth and last definition specifies that a current (new) message (a) completely correlates a triplet if (i) the new message correlates with at least one of siblings; (ii) the sibling does exist and the new message does not correlate any sibling or a child but does correlate the parent; (iii) the sibling does not exist and the new message correlates with the parent or (iv) the parent and sibling do not exist and message correlates with the child; or (b) else partially correlates a triplet if (i) the new message did not correlate with the sibling but did correlate with the child; (ii) the siblings do not exist, the new message did not correlate with the parent but did correlate with the child; or else (c) does not correlate a triplet.

Figure 5:
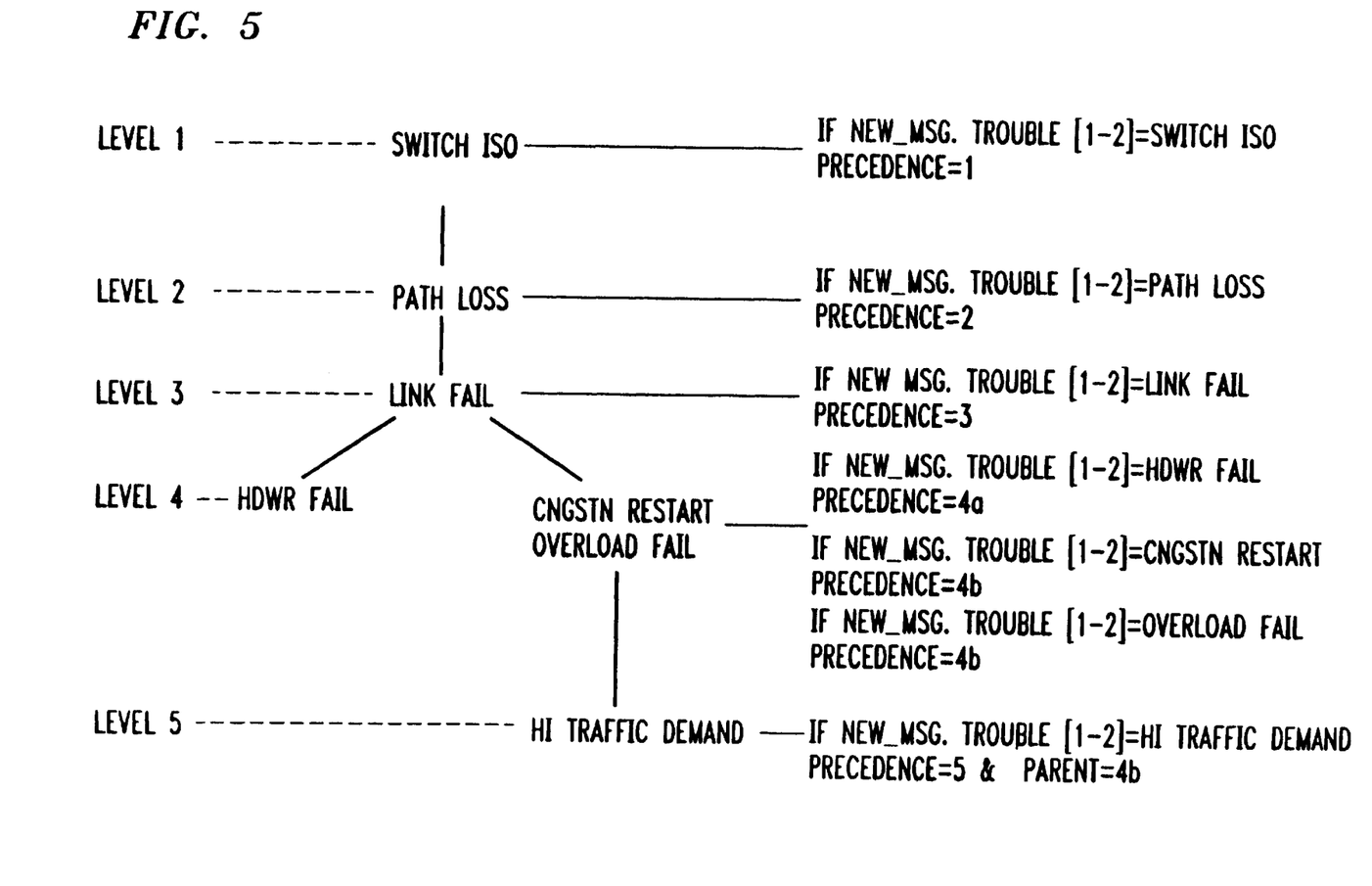
Figure 6:
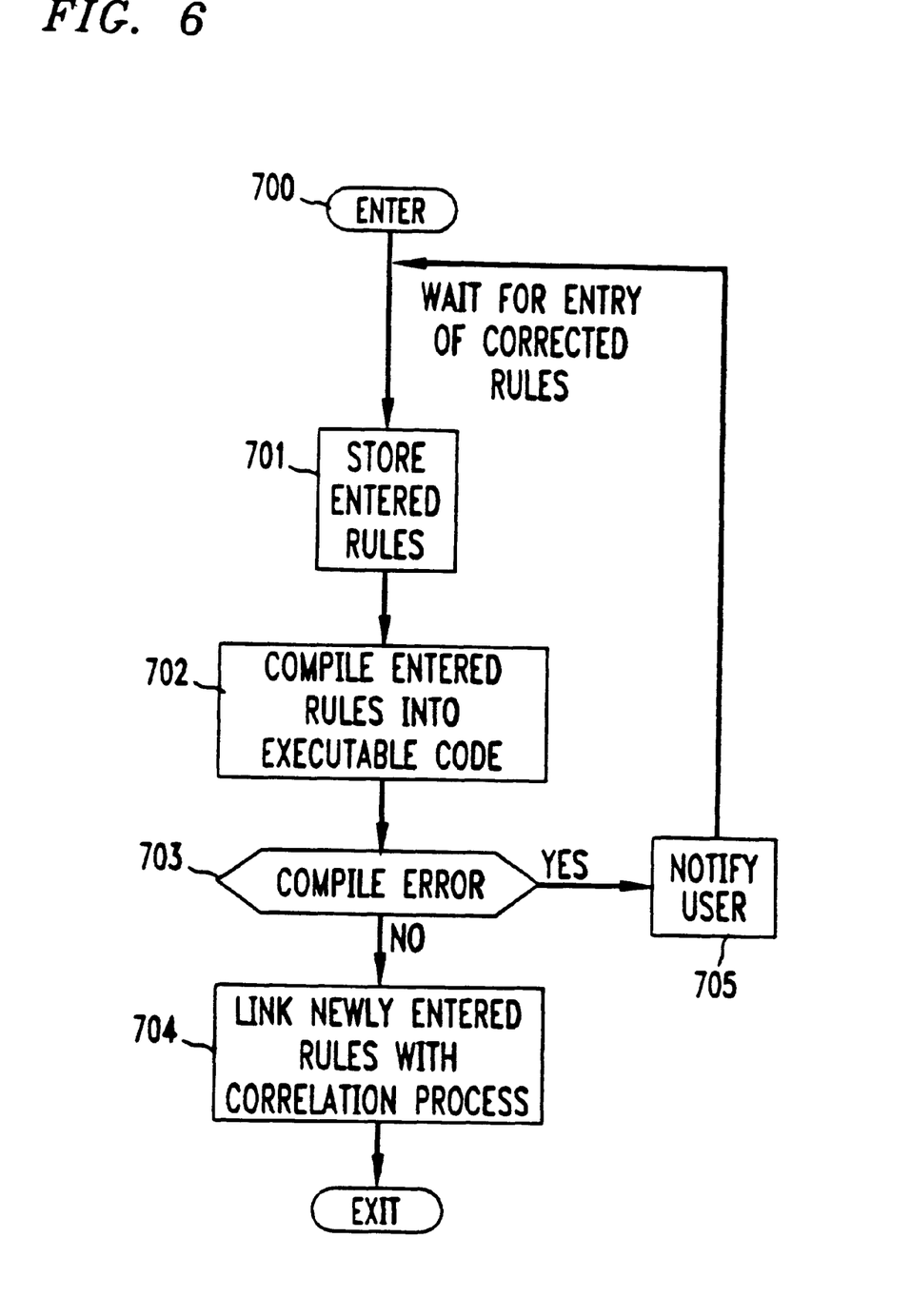
FIG. 6 shows in flow chart form the program which implements the principles of the invention in the code generator of FIG. 1 and which uses the code of FIG. 5 to generate the tree of FIG. 5.

With the foregoing in mind, we now turn to FIG. 6, which shows in block diagram form the program which controls the operation of code generator 330. In particular, when entered (block 700) the program waits for an administrator to use terminal 335 to either define a correlation group by entering new rules or update an existing correlation group by changing previously entered rules. When the user does so, the program proceeds to block 701 where it stores the rules in associated memory. An example of a partial set of rules specifying the level in a correlation tree (e.g., the tree of FIG. 3) that is to be associated with a received alarm message is shown in FIG. 5. (An example of a complete set of rules specifying the correlation group for the tree of FIG. 3 is shown in Appendix A.) It is seen from Appendix A, that the language that is used to specify a rule is a pseudo-English language code and furthermore, that each rule is comprised of (a) a statement that assigns the level in the tree, and following that level, (b) a statement of conditions that must be met for the message of that level to correlate with other messages.

Upon receiving and storing the last of the entered rules, the program proceeds to block 702 where it compiles the language characterizing the entered rules into code that may be executed by processor 315. If the program (block 703) encounters an error during such compilation then the program (block 705) displays the error on the display of terminal 335 and returns to block 700 to await an entry that will correct the error. If an error is not encountered during the compilation of the entered rules then the program (block 704) stores the executable code in database 340 and then links the code to the correlation process. The program then exits.

Figure 7:
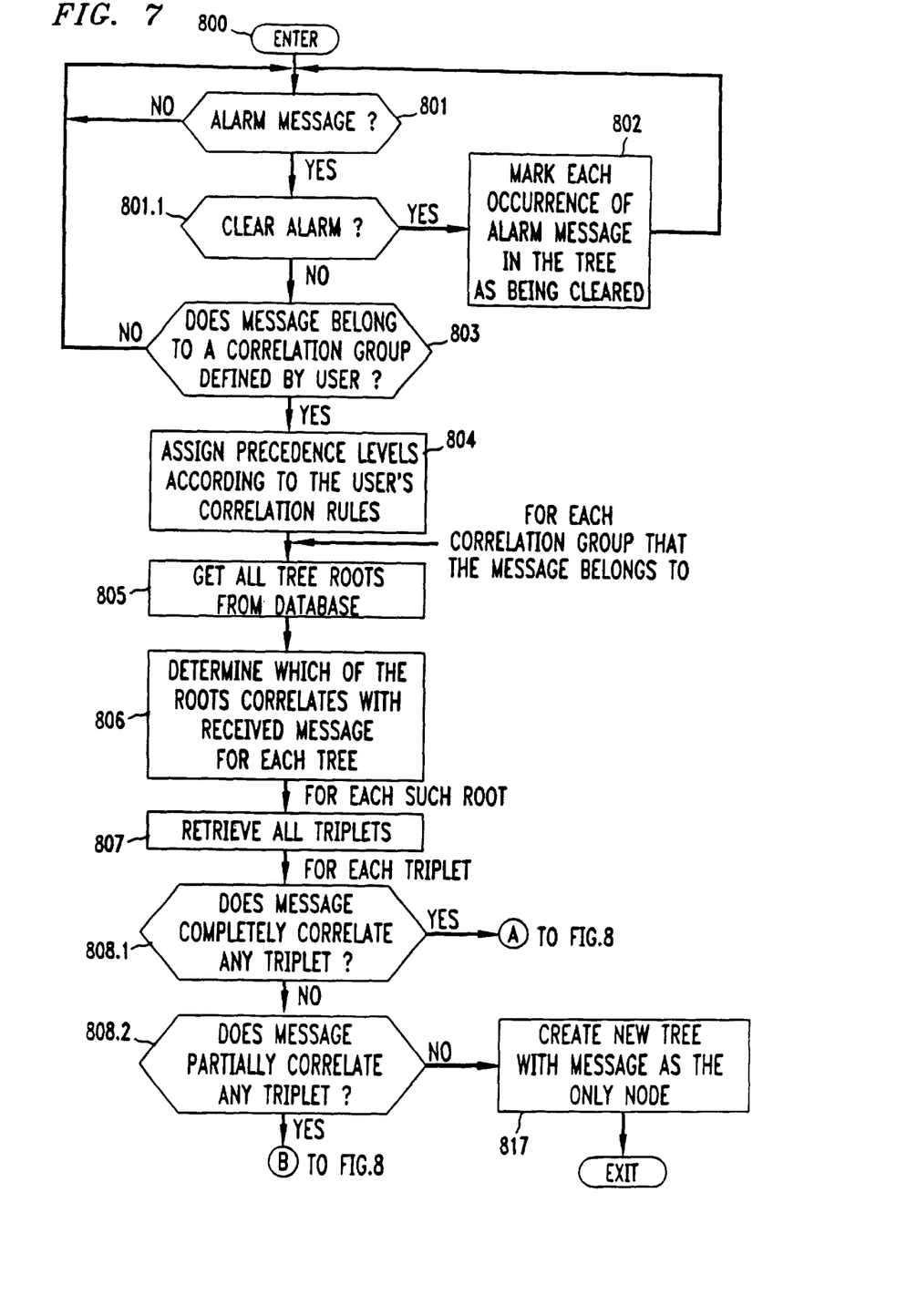
FIGS. 7 and 8 show in flow chart form the program which implements the principles of the invention in the message correlation processor of FIG. 1.
Figure 8:
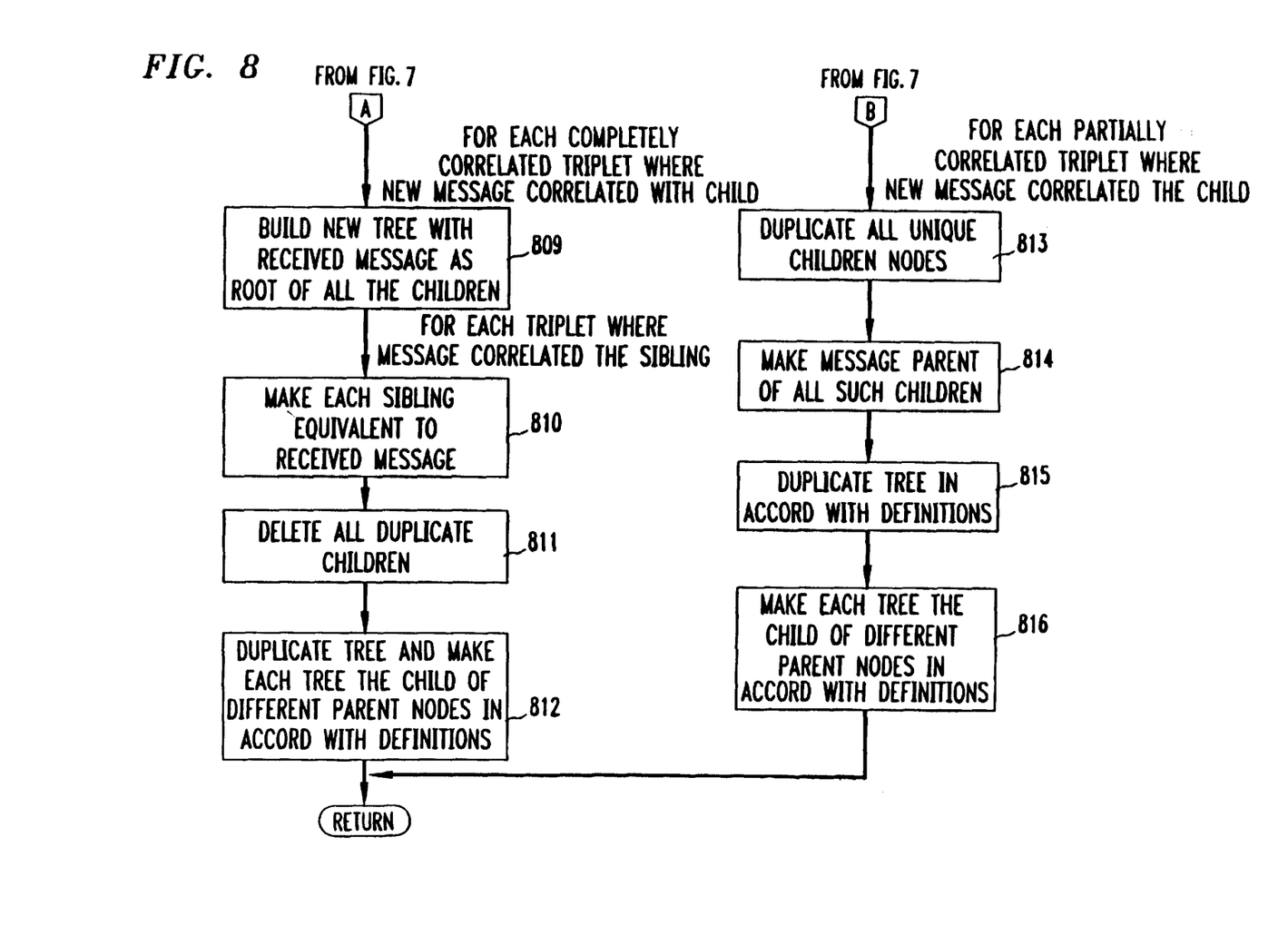

The program which runs on correlation processor 315 is shown in FIGS. 7 and 8. In particular, the program at block 800 proceeds to block 801 upon receipt of a message. At block 801, the program checks the message to determine if it relates to an alarm or to the clearing of an alarm. If the message relates to an alarm or the clearing of an alarm, the program proceeds to block 801.1. Otherwise, it returns to block 800 to await the receipt of the next message. At block 801.1, the program checks the message to determine whether the message is indicative of an alarm or the clearing of an alarm. If the latter, then the program proceeds to block 802 where it marks each occurrence of the associated alarm message in the correlation tree as being clear. Otherwise, the program proceeds to block 803 where it determines if the message belongs to an existing correlation group defined by the user. If not, then the program returns to block 800 to await the entry of the next message. If so, then the program proceeds to block 804 where it assigns a level of precedence to the message for each tree associated with the message, in which a level of precedence is based on the rules entered by the user. For each correlation group, the program then processes the message in accordance with blocks 805 through 816 Specifically, at block 805, the program identifies all roots of trees that may be associated with the received message and then, in accord with the first definition (discussed above) determines at block 806 which of the identified roots correlate with the message. The program then proceeds to block 807 where it identifies all triplets in accord with definitions 2 through 4 (also described above). The program then proceeds to block 808.1, where for each triplet identified at block 807, it determines, in accord with the fifth definition (described above) if the received message completely correlates any such triplet and transfers to block 809 (FIG. 8) if that is the case. If not, then the program at block 808.1 determines if the received message partially correlates any such triplet and transfers to block 813 if that is the case. Otherwise, the program proceeds to block 817 where it creates a new tree with the received message as the only node and then exits.

At block 809, for each triplet that completely correlates with the received message and for which the received message correlates to the child of that triplet (definition four), the program constructs a new tree starting with the received message as the root of the tree, and makes the received message the parent of all the children of all: such triplets. The program then proceeds to block 810 where, for each triplet that completely correlates with the received message and for which the received message correlates to the sibling of that triplet (definition four), the program (a) makes all siblings of all such triplets equivalent to the received message, (b) makes the received message the primary message and (c) makes the received message the parent of all the children of all these siblings. The program then proceeds to block 811. At block 811, the program deletes all duplicates of children that are associated with the received message and proceeds to block 812. At block 812, the program duplicates the tree constructed in blocks 809 and 810 such that the number of duplicates is one less than the number of unique parents the new message correlated with in the completely correlated triplets, thus resulting in one instance of the tree for each of the unique parents. The program then makes a first instance of the tree the child of one parent, a second instance of the tree the child of a second parent and so forth until each parent has exactly one instance of the newly duplicated tree.

If the program transfers to block 813, then for each triplet that partially correlates th the received message and for which the received message correlates to the child of that triplet (definition four), the program duplicates all unique child nodes. The program then proceeds to block 814 where it makes the received message the parent of all the duplicated child nodes from block 813 and then proceeds to lock 815. At block 815, the program duplicates the tree constructed in blocks 813 and 814 such that the number of duplicates is one less than the number of unique parent nodes the received message correlated with in the partially correlated triplets, thus resulting in one instance of the tree for each of the unique parents. The program then makes a first instance of the tree a child of one parent, a second instance of the tree a child of a second parent and so forth until each parent has exactly one instance of the newly duplicated tree.

IF, in the event that the amount of information contained in a received alarm message is not sufficient to determine if the message correlates with a triplet, then the network topology database 350 (FIG. 1) may be queried in accord with the user's specified rules. For example, in FIG. 4, the information in columns 601 and 602 for each trouble indication identifies the end points of the particular element reporting the trouble. For a given set of rules, alarm messages may be correlated if the message and the selected message have at least one common end point. This is seen for message 603 whose end point A and Y correspond with the end points of the selected message. However, certain failures may impact end points different than the end point th at actually reports the failure. For example, the hardware failures designated 605 and 606 are associated with end points E, R and D, Q, respectively. To deal with that problem, the rule associated with the "type of failure" may specify the sending of a query to the topology database to obtain additional information that may be used to determine correlation. For example, for hardware failure 605 the system name in column 607 is inserted in the query message that is sent to database 350. Responsive thereto, database 350 returns other end points that are impacted by the failure. In this case, end points A and Y.

The foregoing is merely illustrative of the principles of the invention. Those skilled in the art will be able to devise numerous arrangements, which, although not explicitly shown or described herein, nevertheless embody those principles that are within the spirit and scope of the invention. For example, the claimed invention may be adapted so that particular alarms are suppressed and not displayed on terminal 320. That is, since tree leaves and roots are indicative of underlying causes and ultimate impacts of a fault, intermediate nodes of the tree between the root and leaves are indicative of intermediate symptoms, which are typically of less interest than causes and impacts. Correlation rules can be written so that correlated messages that are neither roots nor leaves are removed from terminal 320, thereby reducing the number of extraneous alarms on terminal 320.

As another example, the claimed invention can be adapted so that alarms that are correlated together have an aggregate severity level. Typically, an individual alarm has a severity level associated with it (for example critical, major, or minor). Because alarms that are correlated together are related to a common fault condition, it is useful that all alarms in a tree have the same severity level. Correlation rules can be written so that the individual severity level of each alarm in a given correlation tree can be changed to be the same as the most severe level of all alarms in that tree.

What is claimed is:

1. A method of correlating related messages that are generated by different types of sources of said messages comprising the steps of
   receiving at an input a set of predetermined rules for determining when a received message correlates with other priorly received messages,
   responsive to receipt of a message from one of said sources, determining all groups of messages priorly received from other ones of said different types of sources of messages that correlate with said newly-received message and adding said newly-received message to each of said identified groups, if any,
   combining all of said identified groups that may be combined in accordance with said predetermined rules, and responsive to receipt of pseudo-english language entered by a user and characterizing said predetermined rules, converting said language into machine executable code that may be executed by a processor.

2. A method of correlating related messages that are generated by different types of sources of said messages comprising the steps of receiving at an input a set of predetermined rules for determining when a received message correlates with other priorly received messages, responsive to receipt of a message from one of said sources, determining all groups of messages priorly received from other ones of said different types of sources of messages that correlate with said newly-received message and adding said newly-received message to each of said identified groups, if any, and combining all of said identified groups that may be combined in accordance with said predetermined rules, wherein each of said groups of messages define a respective tree of messages, in which the messages forming said tree are in a predetermined order defined by said predetermined rules.

3. The method of claim 2 wherein said messages are associated with respective errors ranging from most severe to least severe and wherein said step of adding includes the step of changing the level of severity associated with said received message when it is added to each of said identified groups to the level of the message having the highest level of severity in that group.

4. The method of claim 2 further comprising the step of responsive to receipt of a request entered by a user and identifying one of said messages for displaying on a display of a terminal all trees of messages containing said identified message.

5. A method of correlating related messages that are generated by different sources of messages comprising the steps of receiving at an input groups of different rules for correlating messages received from said different sources with individual ones of a plurality of messages such that received messages associated with the same tree are arranged in an order of precedence with respect to, one another, responsive to receipt of a message from one of said sources, identifying, in accordance with said groups of predetermined rules, which of the trees the received message may be correlated with and correlating the received message in an order of precedence with respect to the other messages previously correlated with the identified trees, and combining those of said trees that may be combined in accordance with said groups of rules.

* * * * *